United States Patent [19]

Armiger

[11] 4,438,340
[45] Mar. 20, 1984

[54] DOMESTIC ELECTRIC GENERATOR AND STEAM HEATING PLANT

[76] Inventor: Dennis L. Armiger, 94 Chautaugua Rd., Arnold, Md. 21012

[21] Appl. No.: 318,420

[22] Filed: Nov. 5, 1981

Related U.S. Application Data

[63] Continuation-in-part of Ser. No. 286,989, Jul. 27, 1981, abandoned.

[51] Int. Cl.³ .................. F01K 17/02; F01K 17/06
[52] U.S. Cl. .................................... 290/2; 237/12.1
[58] Field of Search ........................ 290/2; 237/12.1

[56] References Cited

U.S. PATENT DOCUMENTS 1,185,246  5/1916  Santry .
3,007,457  11/1961  Ospelt .
3,365,133  1/1968  Norton et al. .................. 237/12.1
3,944,837  3/1976  Meyers et al. ........................ 290/2
3,977,198  8/1976  Berry .

FOREIGN PATENT DOCUMENTS 333102  8/1930  United Kingdom .

Primary Examiner—J. V. Truhe
Assistant Examiner—Shelley Wade
Attorney, Agent, or Firm—Schwartz, Jeffery, Schwaab, Mack, Blumenthal & Koch

[57] ABSTRACT

A method and apparatus for generating heat and electricity for domestic use including generating hot air heat and steam heat, and utilizing the steam to operate a turbine/generator. When the generator's output reaches a predetermined level, the electricity coming from outside the building is disconnected, and the generator supplies at least a portion of the building's needs or feeds electricity back into the power grid.

11 Claims, 1 Drawing Figure

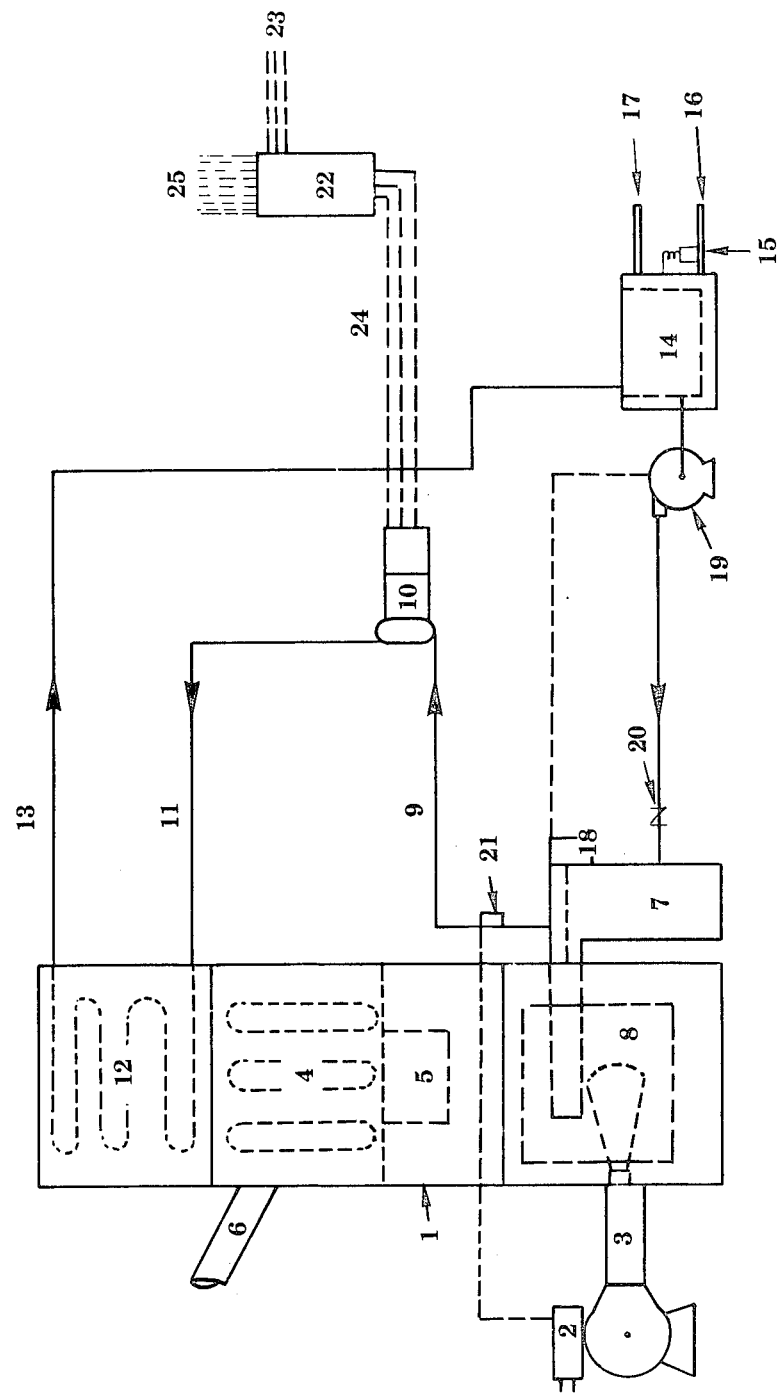

DOMESTIC ELECTRIC GENERATOR AND STEAM HEATING PLANT

CROSS-REFERENCE

This is a continuation-in-part of application Ser. No. 286,989, filed July 27, 1981, now abandoned.

BACKGROUND OF THE INVENTION

Field of the Invention

The invention relates generally to a means of utilizing generated BTUs in oil and natural gas heating systems and more particularly to the conversion of BTUs to steam in order to drive a turbine-powered electrical generator.

OBJECTS AND SUMMARY OF THE INVENTION

It is an object of this invention to increase the use of fuel being used in a heating plant.

Another object is to decrease the amount of electricity being purchased from local power companies.

Still another object is to effect a negative usage of electricity and, in effect, "sell" excess internally generated power back to the local power company.

The above objects are accomplished by providing a steam generating system and a turbine-powered electrical generator. Specifically, the system includes a boiler, that when heated to the proper temperature, produces steam of sufficient pressure to operate a turbine connected to an electrical generator. The generator output is fed into the building's electrical service panel either closing off the incoming circuit and achieving internal electrical self-sufficiency or leaving the incoming circuit open, also achieving internal electrical self-sufficiency, and feeding unused generated power back into the local power grid.

BRIEF DESCRIPTION OF THE DRAWING

The attached drawing is a schematic representation of the system. While reading the following description, reference to the schematic will provide a clear understanding of the operation and advantages of the invention.

DETAILED DESCRIPTION OF THE INVENTION

Referring to the schematic, a conventional hot air furnace 1 is seen. Upon demand for heat, a building thermostat closes and activates a furnace controller 2. The furnace controller then activates a burner 3.

When a plurality of baffle plates 4 are heated to the required temperature, a blower 5 starts, sending heated air into the building.

Operation of currently installed systems allows the venting of many BTUs out of a flue pipe 6.

A boiler 7 is inserted into a combustion chamber 8 of the furnace. The water in the boiler converts to steam and the steam travels through a pipe 9 and turns a turbine-powered/generator 10 (for example, ONAN Model 3PL3P). Spent steam leaves the turbine/generator unit through a pipe 11 and enters a heating coil 12 in the furnace plenum, thus utilizing additional BTUs by further heating the forced air entering the building.

The steam continues, through a pipe 13, into a condensate tank/reservoir 14, located in the cold air return duct, where steam recapture is accomplished and additional BTUs are returned to the furnace. Water level is maintained in the reservoir 14 by a conventional water level and temperature controller mechanisms indicated at 15 (for example, Honeywell Model L4006A1371 "Aquastat" controller). If the steam does not condense quickly enough, for example, to a maximum of 180° F., the controller 15 also allows cooling water in via a supply pipe 16. Water in excess of reservoir needs is discharged through a cooling water drain 17.

When the water level falls, a controller 18 (for example, Flowswitch by McDonald-Miller Model FS 4-3) activates a pump 19 and restores the proper water level from condensate tank/reservoir 14. Water is maintained in the boiler 7 by a check valve 20. When a predetermined pressure, for example, 15 psi steam pressure, is achieved, a steam controller 21 opens burner control 2, and activates a starter motor on generator (not shown in schematic), leaving sufficient steam in the system to continue heating the building and to drive the turbine. When the steam pressure drops to a predetermined level, for example, 5 psi, the burner 3 is again activated through control 2 by controller 21 (for example, Honeywell Model L 404 F 1060).

When the generator output reaches 220 volts, an electrical distribution center 22 opens a utility company circuit 23 and closes a circuit 24, thus achieving electrical self-sufficiency in the building. A plurality of leads 25 carry generated electricity and power company electricity throughout the building. An optional plan would leave circuit 23 closed, allowing generated power to feed into the local area grid for negative power usage by the building.

When the building reaches a preset temperature, burner control 2 opens to shut down the system.

OPERATION

A typical operation of the invention will be seen from the description set out below.

Any building heating system that utilizes an open flame to heat air, wastes many BTUs by venting the combusion chamber to the flue. By inserting a small boiler 7, as seen in the schematic, over the open flame, steam will be produced therein without substantially effecting the designed efficiency of the furnace system. Sufficient steam pressure will be achieved to power a small turbine/generator unit capable of a 220 volt output. The generated power will be fed into the building electrical distribution center and will supply at least some of the electricity needs of the building.

The turbine/generator unit 10 will vary in size depending on building requirements. This will result also in system rated steam psi variances to accomodate larger or smaller units.

Since the system is closed, recovery of the steam must take place within the confines of the system. To this end, the steam will leave the turbine/generator unit 10 and enter the condensate heating coil 12 in the plenum of the furnace. This coil, in addition to starting the condensation of the steam, will add additional BTUs to the air passing by. Steam will continue on to the condensate tank/resorvoir 14, located in the cold air return duct, where final condensation will take place. Water level in the system will be maintained by the condensate pump 19.

There will be times when the system electrical production will exceed building requirements. At such times, the excess electricity will flow back into the local power grid. This will produce a cost recovery of electrical units previously consumed during system non-operation.

While the invention has been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of generating heat and electricity for building use comprising:
   (a) providing a furnace having a plenum chamber with a combustion chamber therein, said furnace generating hot air;
   (b) placing a steam generating boiler in said combustion chamber;
   (c) connecting a turbine to said boiler, passing the steam from said turbine through coils in said plenum chamber in said furnace to supply a secondary heating source;
   (d) said turbine driving an electric generator; and
   (e) feeding electricity from said generator into the building's electrical service.

2. A method as defined in claim 1 including:
   (a) measuring the pressure between said boiler and said turbine;
   (b) extinguishing a burner in said combustion chamber when the pressure between said boiler and said turbine reaches a first predetermined level; and
   (c) reactivating said burner when the pressure drops to a second predetermined level.

3. A method as defined in claim 1 including:
   (a) capturing the steam from said turbine in a condensate tank/reservoir; and
   (b) maintaining the water level and temperature at predetermined levels in said condensate tank/reservoir.

4. A method as defined in claim 3 including measuring the water level in said boiler, and replenishing water from said condensate tank/reservoir if the water level in said boiler falls below a predetermined level.

5. A method as defined in claim 1, including feeding power exterior to the building through electricity lines coming into the building.

6. A method as defined in claim 1 including disconnecting electricity lines coming into the building when the output from said generator reaches a predetermined level.

7. A method as defined in claim 1 including feeding electricity back into the local power grid.

8. An electric generator and heating plant for building use comprising:
   (a) a hot air furnace having a plenum and a combustion chamber therein;
   (b) a burner in said combustion chamber;
   (c) a boiler positioned in said combustion chamber above said burner;
   (d) a turbine connected to said boiler;
   (e) a condensate tank/reservoir connected to said turbine and means for maintaining the water level and temperature therein at predetermined levels, coil means in said plenum connected between said turbine and said condensate tank/reservoir;
   (f) an electric generator connected to and driven by said turbine; and
   (g) means for receiving electricity from outside the building; and means for distributing it to the building.

9. A plant as defined in claim 8 including means for measuring the pressure between said boiler and said turbine, and means for extinguishing said burner when said pressure reaches a first predetermined level and reactivating said burner when the pressure drops to a second predetermined level.

10. A plant as defined in claim 8 including means for measuring the water level in said boiler and replenishing the water from said condensate tank/reservoir if the water level in said boiler falls below a predetermined level.

11. A plant as defined in claim 8 including means for disconnecting said electricity receiving means when the output of said generator reaches a predetermined level.

* * * * *